W. MULL.
Corn-Planters.
No. 141,723. Patented August 12, 1873.
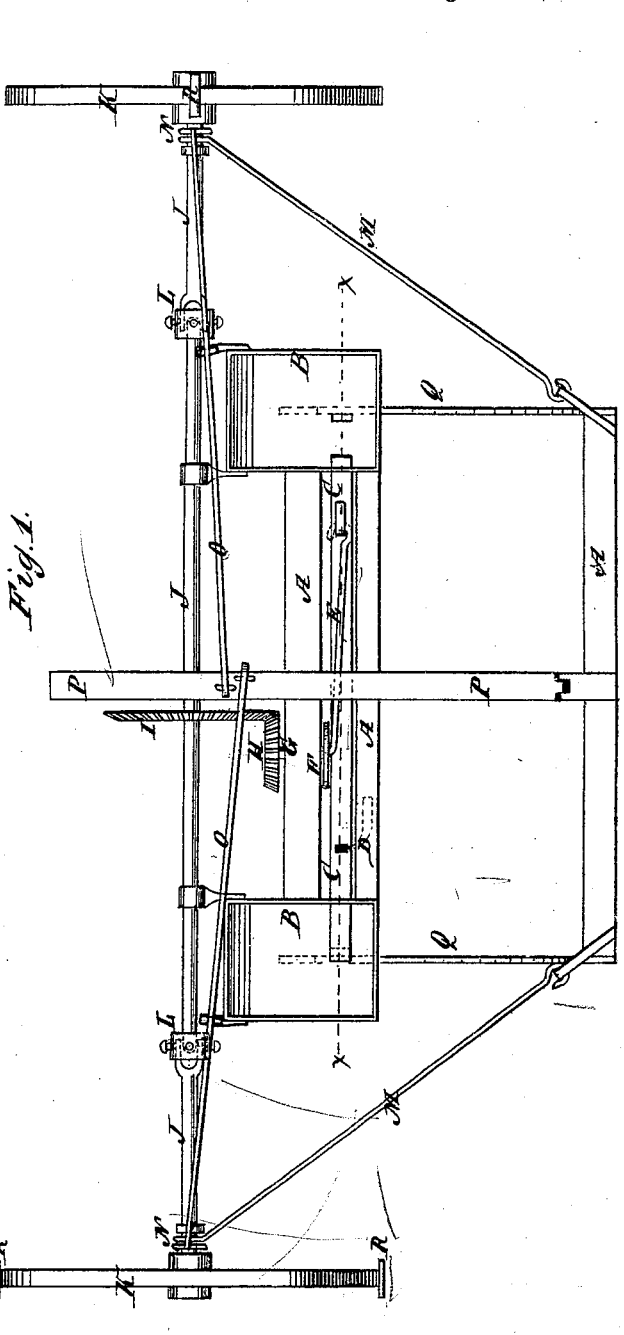
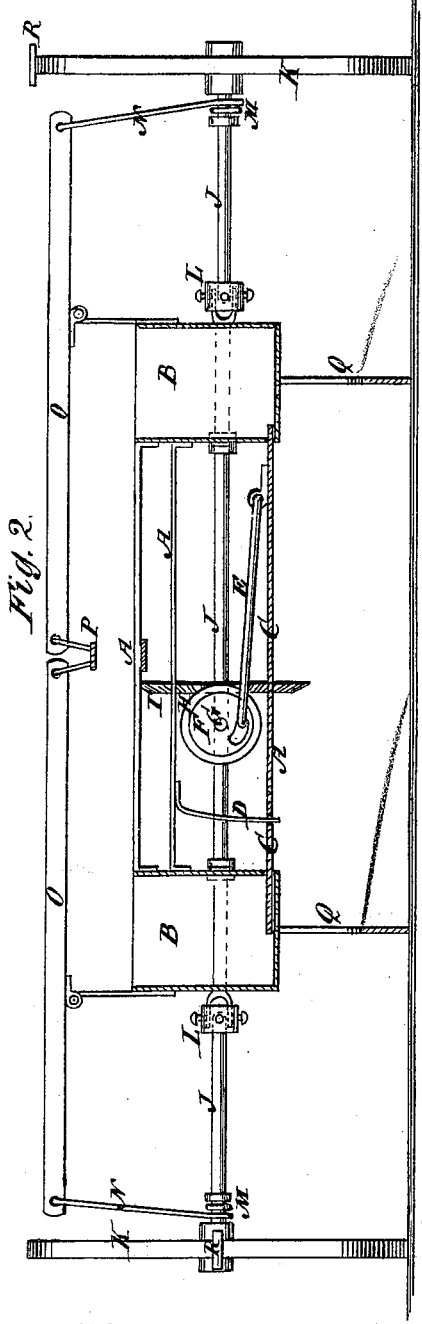
Witnesses:
E. Wolff.
Sedgwick
Inventor:
W. Mull
Per
Attorneys.

UNITED STATES PATENT OFFICE.

WILLIAM MULL, OF RANTOUL, ILLINOIS.

IMPROVEMENT IN CORN-PLANTERS.

Specification forming part of Letters Patent No. 141,723, dated August 12, 1873; application filed April 19, 1873.

*To all whom it may concern:*

Be it known that I, WILLIAM MULL, of Rantoul, in the county of Champaign and State of Illinois, have invented a new and useful Improvement in Corn-Planters, of which the following is a specification:

Figure 1 is a top view of a corn-planter to which my improvement has been applied. Fig. 2 is a vertical cross-section of the same taken through the line $x\ x$, Fig. 1.

Similar letters of reference indicate corresponding parts.

The invention consists in the improvement of corn-planters and markers, as hereinafter described and pointed out in the claims.

A represents the frame of the machine, to which the seed-hoppers B are attached. C is the dropping-slide, the ends of which enter the lower parts of the hopper B through holes in their inner sides. D is a spring, the upper end of which is attached to a cross-bar of the frame A, and its lower end enters a hole in the dropping-slide C, to bring said slide back to its position when released from the device that moves it, as hereinafter described. To the slide C toward one end is pivoted the end of the connecting-rod E, the other end of which is bent at right angles, passing through a short curved slot in the wheel or disk F, and is secured in place by a nut or other convenient means. The wheel or disk F is attached to the end of a short shaft, G, which revolves in bearings attached to a cross-bar of the frame A, and to its other end is attached a bevel-gear wheel, H, the teeth of which mesh into the teeth of a bevel-gear wheel, I, attached to the axle J. The axle J revolves in bearings attached to the frame A, and to its ends are rigidly attached the wheels K, so that the said wheels may carry the said axle with them in their revolution. In each end of the axle J at a little distance from the wheels K is formed a universal joint, L, so that the said wheels may accommodate themselves to the surface of the ground, however uneven said surface may be. A further use of the joint is to enable the wheels to be lifted (by levers and rods O P N) when the machine is to be turned about, or the discharge of seed requires to be arrested. M are brace-rods, the forward ends of which are pivoted to the forward parts of the frame A, and their rear ends are pivoted to the axle J at the inner side of the wheels K, to sustain the draft-strain upon the said wheels K, and keep the three parts of the axle in the same vertical plane. To the end parts of the axle J are also pivoted the lower ends of the rods N, the upper ends of which are pivoted to the outer ends of the levers O, which are pivoted to supports attached to the frame A. The inner ends of the levers O nearly meet and are connected with the lever P. The forward end of the lever P is pivoted to the forward part of the frame A, and its rear end extends back into such a position that it may be readily reached and operated by the driver with his feet to raise the wheels K from the ground for convenience in turning. The weight of the machine is supported by the runners Q, that open the ground to receive the seed. To the rims of the wheels K are attached cross-blocks R in such positions as to mark the ground as each hill is dropped, so that the planting may be done in accurate check-row. The disk that works the seed-slide has a slot in order to get a quick motion when dropping the corn in a hill. This is done with the assistance of the spring that enters the seed-slide. Without the slotted disk the motion of the seed-slide would be too slow and would scatter the corn in the row.

Having thus described my invention, I claim as new and desire to secure by Letters Patent—

1. The combination of the revolving axle J, universally jointed at L L, with the pivoted braces M M, to enable the wheels to be raised or to accommodate themselves to uneven ground, without allowing the end sections to get out of alignment with the middle section, in the manner described.

2. The lever P, levers O O, and rods N N, combined with the end sections of a jointed revolving axle, as described, to allow the wheels to be raised for turning, or to cause the dropping of seed to cease.

3. The combination, with the link-rod E and dropper-slide C, of the slotted disk or crank-wheel F and the slide-spring D, to drop the seed in the manner specified.

WILLIAM MULL.

Witnesses:
    J. H. PAYTON,
    E. K. SWARTZ.